United States Patent
Del Sordo et al.

(10) Patent No.: US 12,412,577 B2
(45) Date of Patent: Sep. 9, 2025

(54) VOICE CONTROL CONFIGURATION USING A GRAPHICAL USER INTERFACE

(71) Applicant: ARRIS Enterprises LLC, Suwanee, GA (US)

(72) Inventors: Christopher S. Del Sordo, Souderton, PA (US); Mallika Subramanyam, Warrington, PA (US); Christopher R. Boyd, Chalfont, PA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 400 days.

(21) Appl. No.: 18/117,560

(22) Filed: Mar. 6, 2023

(65) Prior Publication Data

US 2023/0290350 A1   Sep. 14, 2023

Related U.S. Application Data

(60) Provisional application No. 63/319,483, filed on Mar. 14, 2022.

(51) Int. Cl.
| | | |
|---|---|---|
| *G10L 15/00* | (2013.01) | |
| *G06F 3/16* | (2006.01) | |
| *G10L 15/22* | (2006.01) | |
| *H04N 21/422* | (2011.01) | |
| *G10L 15/30* | (2013.01) | |

(52) U.S. Cl.
CPC ............. *G10L 15/22* (2013.01); *G06F 3/167* (2013.01); *H04N 21/42203* (2013.01); *G10L 2015/223* (2013.01); *G10L 15/30* (2013.01)

(58) Field of Classification Search
CPC ......... G10L 15/22; G10L 15/26; G10L 15/30; G10L 15/02; G10L 15/1822; G10L 15/183; G10L 15/19; G10L 15/193; G10L 15/187; G10L 15/063; G10L 15/065; G10L 2015/0631; G06F 3/16; H04M 2201/40

See application file for complete search history.

(56) References Cited

U.S. PATENT DOCUMENTS 11,095,766 B2 *   8/2021   Coffman ............... C08F 232/08

\* cited by examiner

*Primary Examiner* — Vu B Hang
(74) *Attorney, Agent, or Firm* — Wenderoth, Lind & Ponack, L.L.P.

(57) ABSTRACT

Dynamic configuration and reconfiguration of Voice Control Assistants (VCAs) for Customer Premise Equipment (CPE) devices is provided via a Graphical User Interface (GUI). GUI is presented to provide a list of one or more voice control assistants (VCAs) supported by a CPE device. A selection of a VCA is received from the list of the one or more VCAs presented by the GUI. A configuration interface for the VCA selected from the list of the one or more VCAs from the list of the one or more VCAs is presented on the GUI. Configuration input on the configuration interface of the GUI is received to generate configuration data for the VCA selected from the list of the one or more VCAs. The configuration data is provided to the CPE for implementing the VCA selected from the list of the one or more VCAs according to the configuration data.

29 Claims, 6 Drawing Sheets

VOICE CONTROL CONFIGURATION USING A GRAPHICAL USER INTERFACE

BACKGROUND

The subject matter of the present disclosure relates to providing dynamic configuration and reconfiguration of Voice Control Assistants (VCAs) for Customer Premise Equipment (CPE) devices.

Voice Control Assistants (VCAs) or Virtual Assistants (VAs) are software agents that can perform tasks or services for an individual based on commands or questions. Some VCAs are able to interpret human speech and respond via synthesized voices. Users can ask their assistants questions, control home automation devices and media playback via voice, and manage other basic tasks such as email, to-do lists, and calendars with verbal commands.

VCAs may operate based on input other than voice commands. However, voice input is the most common type of input. For example, Amazon Alexa, Siri, or Google Assistant respond to voice commands. VCAs use Natural Language Processing (NLP) or Natural Language Understanding (NLU), as well as cloud data storage, to process many human request in real time, mimicking natural human communication.

Voice-controlled assistants (VCAs) are changing the way people interact with technology. VCAs are being integrated in numerous devices, such as set-top boxes (STBs), smart media devices (SMDs), smartphones, speakers, smartwatches, smart televisions, cars, headphones, game consoles, household appliances, and Internet-of-Thing (IoT) devices. These solutions can be integrated with a variety of microphone input sources, wake word configurations and voice recognition natural language processing solutions. Unless the system is deactivated by the user, the software always listens for wake words or trigger keywords, such as "Alexa" and "Hey Siri," and automatically starts audio recording when awakened. The request is then transmitted to the cloud, processed using NLU, and assigned to a specific intention. Depending on the inquiry, the server will provide relevant information for the VCA to be presented to the user or execute tasks with numerous voice applications and connected devices.

VCAs have access to rapidly growing amounts of services developed directly by VCA providers or external companies. Because built-in capabilities voice capabilities, e.g., Alexa Skills and Google Actions) are stored in the cloud, there is no need for users to download or install them, unlike smartphone apps. Third-party voice extensions can be published for the general public in a voice app store or used exclusively within an organization, which provides a great opportunity for companies to use VCAs for their specific needs.

Customer Premise Equipment (CPE) device manufactures are integrating voice control technologies at an increasing rate. Since it is possible that a device can have more than one voice control technology running; each of the VCAs would one use a different wake word, secondly they could use different or the same microphone source and third the same or different voice recognition natural language processing solutions could be used.

Consumers can purchase a variety of pluggable microphones that they can use with the CPE device. It would be advantageous for the CPE device middleware to provide the ability for the consumer to configure one or more VCAs during initialization to use these microphones or specific wake words. Further, many CPE devices such as DTVs or STBs will include multiple VCAs with one being customized to execute voice commands specific to the device (e.g., Xfinity voice) and one that would handle more general VCA commands (e.g., Alexa).

Current settings screens on devices do not provide enabling of more than one VCA, and do not provide the ability to configure the wake word, NLU, IoT devices or microphone source. Informational screen currently available on specific VCAs also do not currently allow these type of advanced configurations and subsequent field upgradability. It would be convenient if CPE devices provided an information screen that provided insight to more details on each VCA and examples of which VCA to use for which type of command.

SUMMARY

An aspect of the present disclosure involves a system and method to providing dynamic configuration and reconfiguration of Voice Control Assistants (VCAs) for Customer Premise Equipment (CPE) devices.

A device has a display that is used to present a graphical user interface (GUI). The device accesses information that defines one or more voice control assistants (VCAs) and supported configurations of the one or more VCAs. The device presents the GUI on the display to provide a list of the one or more VCAs and the supported configurations of the one or more VCAs based on the accessed information that defines the one or more VCAs and the supported configurations of the one or more VCAs. A selection of a VCA is received from the list of the one or more VCAs on the GUI. A configuration interface shows only the supported configurations of the VCA selected from the list of the one or more VCAs. Configuration input is received on the configuration interface of the GUI to generate configuration data for the VCA selected from the list of the one or more VCAs. The configuration data is provided to a Customer Premise Equipment (CPE) for implementing the VCA selected from the list of the one or more VCAs according to the configuration data.

The information that defines the one or more voice control assistants (VCAs) and the supported configurations of the one or more VCAs is obtained from the CPE, wherein the CPE downloads the information that defines the one or more voice control assistants (VCAs) and the supported configurations of the one or more VCAs from a download server.

The selection of the VCA from the list of the one or more VCAs further includes a selection of one or more configurable VCA elements associated with the VCA selected from the list of the one or more VCAs.

The one or more configurable VCA elements include at least one of a voice command executable by the VCA selected from the list of the one or more VCAs, a voice command to enable a VCA from the list of the one or more VCAs, a voice command to disable a VCA from the list of the one or more VCAs, a wake word configuration for initiating control of the VCA selected from the list of the one or more VCAs, a peripheral configuration setting including a configuration for a microphone, a voice recognition natural language processing (NLP) setting, and a setting for control of an Internet-of-Things (IoT) device.

The processor presents the GUI and the configuration interface that are received from the CPE.

The one or more VCAs include one or more of a general VCA, a VCA of the CPE, and a VCA of a smart television or set top device.

The one or more VCAs include a VCA for combined control of a general VCA and the CPE.

The device having the display may be a television connected to the CPE.

A customer premise equipment (CPE) device includes a memory storing computer-readable instructions, and a processor configured to execute the computer-readable instructions to access information that defines one or more voice control assistants (VCAs) and supported configurations of the one or more VCAs, present, on a device having a display, a graphical user interface (GUI) to provide a list of the one or more VCAs and the supported configurations of the one or more VCAs based on the accessed information that defines the one or more VCAs and the supported configurations of the one or more VCAs, receive, from the GUI, a selection of a VCA from the list of the one or more VCAs, present, on the device having the display, a configuration interface showing only the supported configurations of the VCA selected from the list of the one or more VCAs, receive, from the configuration interface of the GUI, configuration data to configure the VCA selected from the list of the one or more VCAs, and update a configuration file stored in the memory to implement the VCA selected from the list of the one or more VCAs according to the configuration data.

The information that defines the one or more voice control assistants (VCAs) and the supported configurations of the one or more VCAs is downloaded from a download server.

The processor updates the configuration file stored in memory by determining a link to a download library associated with the VCA selected from the list of the one or more VCAs, downloading, from a download server the download library associated with the VCA selected from the list of the one or more VCAs, loading the download library for the VCA selected from the list of the one or more VCAs into the configuration file in the memory, and performing a reboot to implement the download library for the VCA selected from the list of the one or more VCAs loaded into the configuration file in the memory.

The download library associated with the VCA selected from the list of the one or more VCAs includes one or more associated configurable VCA elements.

The one or more configurable VCA elements includes at least one of a voice command executable by the VCA selected from the list of the one or more VCAs, a voice command to enable a VCA from the list of the one or more VCAs, a voice command to disable a VCA from the list of the one or more VCAs, a wake word configuration for initiating control of the VCA selected from the list of the one or more VCAs, a peripheral configuration setting including a configuration for a microphone, a voice recognition natural language processing (NLP) setting, and a setting for control of an Internet-of-Things (IoT) device.

The device having the display for presenting the GUI and the configuration interface includes one of a connected television and a computer.

The one or more VCAs include one or more of a general VCA, a VCA of the CPE, and a VCA of a smart television or set-top box.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to providing dynamic configuration and reconfiguration of Voice Control Assistants (VCAs) for Customer Premise Equipment (CPE) devices.

Figure 1:
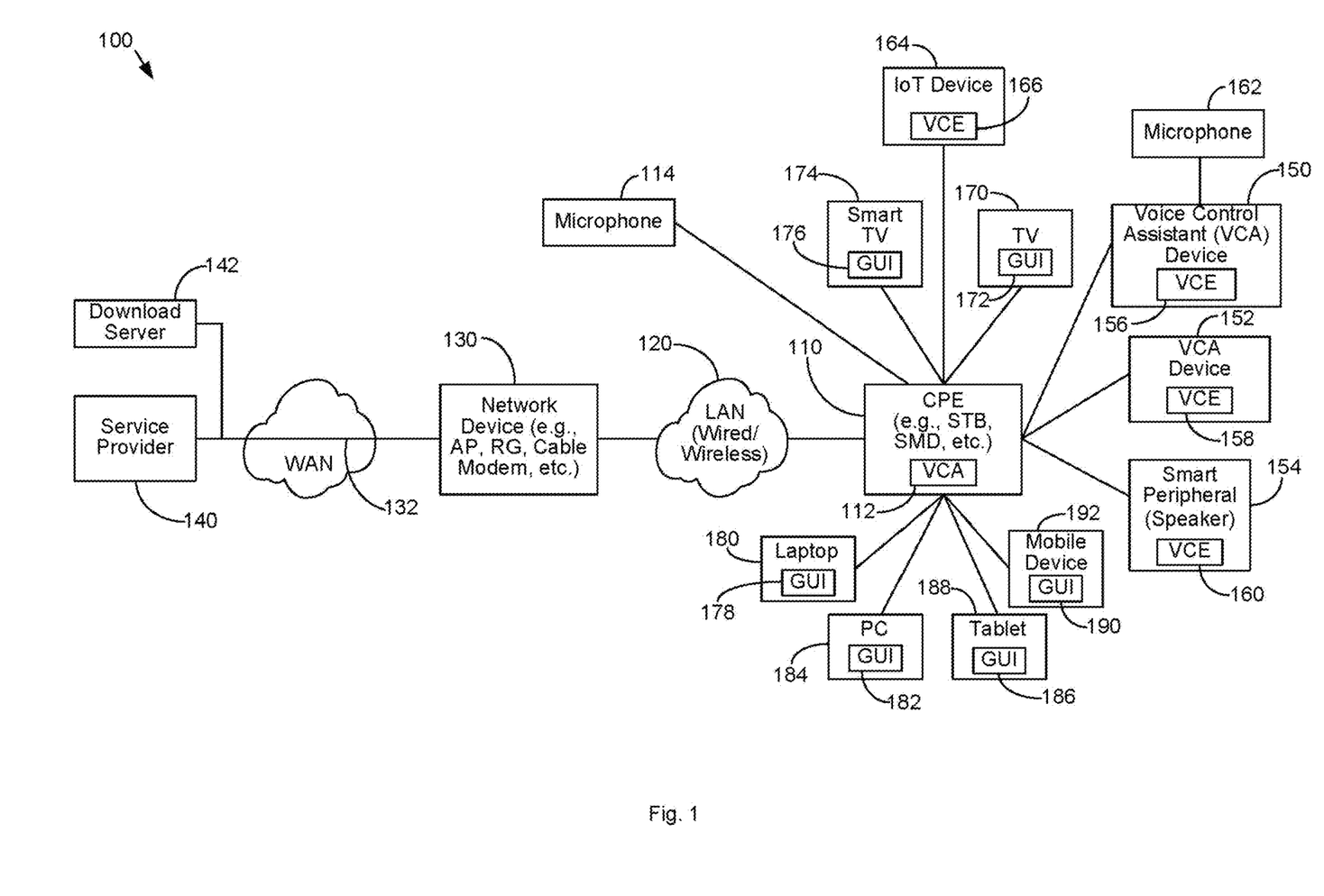
FIG. 1 illustrates a System having devices with graphical user interfaces (GUI) for configuring Customer Premise Equipment (CPE) devices.

FIG. 1 illustrates a System 100 having devices with graphical user interfaces (GUI) for configuring Customer Premise Equipment (CPE) devices.

In FIG. 1, System 100 includes CPE device 110 coupled to a Network Device 130 through a Local Area Network (LAN) 120. Network Device 130 may be an Access Point (AP), Residential Gateway (RG), a Cable Modem, etc. LAN 120 may be coupled to AP 130 and/or CPE device 110 by a wired connection (e.g., an Ethernet cable) or a wireless connection (e.g., Wi-Fi, Bluetooth, etc.).

Network Device 130 can be, for example, a hardware electronic device that may be a combination modem and gateway device that combines the functions of a Cable Modem, an Access Point (AP), Residential Gateway, and/or a Router for providing content received from the Service Provider 140 to Network Device 130 in the system. It is also contemplated that Network Device 130 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. CPE device 110 is coupled to Client Devices 150, 152, 154, 164, 170, 174, 180, 184, 188, 192.

The connections between CPE device 110 and Client Devices 150, 152, 154, 164, 170, 174, 180, 184, 188, 192 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connections between CPE device 110 and Client Devices 150, 152, 154, 164, 170, 174, 180, 184, 188, 192 can be implemented using a wireless connection that operates in accordance with, but is not limited to, RF4CE protocol, ZigBee protocol, Z-Wave protocol, or IEEE 802.15.4 protocol. It is also contemplated that the connections between CPE device 110 and Client Devices 150, 152, 154, 164, 170, 174, 180, 184, 188, 192 can include connections to a media over coax (MoCA) network. One or more of the connections between CPE device 110 and Client Devices 150, 152, 154, 164, 170, 174, 180, 184, 188, 192 can also be a wired Ethernet connection.

Network Device 130 may be coupled to Service Provider 140. Service Provider 140 may be, for example, a streaming video provider or any computer for connecting the AP 130 to the Internet. The connection 132 between the Service Provider 140 and the Network Device 130 can be implemented using, for example, a wide area network (WAN). The connection 132 between the Service Provider 140 and the Network Device 130 may also be implemented using a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

Connection 132 can further include as some portion thereof a broadband mobile phone network connection, an optical network connection, or other similar connections. For example, the connection 132 can also be implemented using a fixed wireless connection that operates in accordance with, but is not limited to, 3rd Generation Partnership Project (3GPP) Long Term Evolution (LTE) or 5G protocols. It is also contemplated that connection 132 is capable of providing connections between Network Device 130 and a WAN, a VPN, MANS, PANs, a DOCSIS network, a fiber optics network (e.g., FTTH, FTTX, or HFC), a PSDN, a global Telex network, or a 2G, 3G, 4G or 5G network, for example.

CPE device 110 may be coupled to one or more Voice Control Devices, such as Voice Control Devices 150, 152. CPE device 110 may also be coupled to one or more a Smart Peripherals (e.g., a speaker) 154, and/or one or more Internet-of-Thing (IoT) devices 164. IoT devices 164 are objects that are embedded with sensors, processing ability, software, and other technologies that are programmed for certain applications and that connect and exchange data with other devices and systems over the Internet or other communications networks. CPE device 110 may be coupled to TV 170, and Smart TV 174 to present content thereon. In addition, Computer devices, such as Laptop 180, PC 184, Tablet 188, and Mobile Device 192, such as mobile phones, may access CPE device 110. VCA device 150, VCA device 152, Smart Peripheral 154, IoT device 164 may include one or more configurable Voice Control Elements 156, 158, 160, 166, respectively that may provide at least one of wake word functionality, a peripheral functionality including an operation of a microphone, a voice recognition NLP capability, and a IoT device functionality.

A Graphical User Interface (GUI) may be used to. provide dynamic configuration and reconfiguration of VCAs, such as for general VCAs (e.g., Alexa enabled devices), such as VCAs 150, 152, and VCAs 112 embedded in Customer Premise Equipment (CPE) devices. In FIG. 1, CPE device 110 may present GUI 172 on TV 170 and/or GUI 176 on Smart TV 174 or a set-top box. For example, GUIs can be downloaded in JavaScript from a Download Server 142. Download Server may be independent or separate from Service Provider 140 or may be provided by Service Provider 140. Then the GUI can be hosted at the CPE device 110. The CPE device 110 may present GUI 172, 176 at TV 170, Smart TV 174, respectively, where the user may then interact to configure, for example, VCAs 150, 152 and/or VCA 112 of the CPE device 110.

Some devices may launch a GUI so the user does not then interact directly with the CPE device 110. For example, Smart TV 174 may launch GUI 176, Laptop 180 may launch GUI 178, PC 184 may launch GUI 182, Tablet 188 may launch GUI 186, and Mobile Device 192 may launch GUI 190. Smart TV 174, Laptop 180, PC 184, Tablet 188, and Mobile Device 192 may independently download GUIs 176, 178, 182, 186, 190, respectively, and then run the GUIs independently. In addition, or alternatively, Smart TV 174, Laptop 180, PC 184, Tablet 188, and Mobile Device 192 may connect to CPE device 110 to access a configuration GUI.

In each instance, however, a GUI is used to provide configuration data to the CPE device 110, and then the CPE device acts based on the received configuration data. The configuration data is stored on the CPE device 110 so that the CPE device 110 can use that configuration data to determine if there are updated assistance or builds to implement what the consumer desired to have configured.

GUIs 176, 178, 182, 186, 190 enable configuration of specific voice command functionality for a device. For example, on STB or Smart TV, commands such as channel up, channel down, turn volume up, turn volume down, etc. can be sent to Alexa, but Alexa is not made for executing such commands. Alexa is designed for more general assistance, such as asking what the weather forecast for today. VCA 112 provides separate functionality for control of CPE device 110 as well as VCA device 150, VCA device 152, Smart Peripherals 154, and IoT device 164.

There are different peripherals and wake words, etc. that can be configured separately for each VCA. GUIs 172, 176, 178, 182, 186, 190 may allow a user to assign a wake word for each VCA that has been enabled. Reconfiguration of a wake word that was previously assigned would also be possible. Also, after booting up, CPE device 110 may be configured to detect the various microphone sources and provide the ability for a user to assign a detected microphone source for each VCAs enabled. Any non-compatible microphone source combinations would be clearly defined. During the bootup process, one or more GUIs, such as GUIs 172, 176, 178, 182, 186, 190 may be used to reconfigure a previously selected microphone source. For example, a preferred microphone 162 for VCA 150 may be purchased. Further, one microphone 114 may be preferred for the CPE device 110 and a different microphone 162 for VCA device 150. For example, microphone 162 may want to be switched, e.g., from a far-field microphone that is plugged into Universal Serial Bus (USB) to a BLE microphone or a RF4CE (Radio Frequency for Consumer Electronics) voice microphone. The user interacts with the GUI to select a Bluetooth Low Energy (BLE) microphone to use with Alexa using the Alexa wake word. The CPE device 110 may access a software server that can provide code for the use of a BLE microphone with the VCA device 150. If the code is not available for the BLE microphone implementation, a GUI would indicate that such an implementation is not possible. This functionality is part of the CPE, wherein the inputs are provided from the configuration screen as it is processed by the CPE. There may also be different wake words for different VCAs, such as VCA device 150, VCA device 152. The user may want to configure these VCEs individually.

After configuration has been completed, instructions or program code may be upgraded in runtime. The CPE device 110 determines whether specific implementations can be provided by an upgrade from a server. The CPE device 110 may download the upgrade from Download Server 142, load it, and the CPE device 110 may then reboot. The capability of how VCAs can be configured is specific to a particular VCA. But the VCAs do not perform any of this functionality, rather this is performed by the CPE device 110.

GUIs 172, 176, 178, 182, 186, 190 enable a user to configure or reconfigure VCAs. For example, the CPE device 110 may provide GUI 172 that is present by TV 170 after the CPE device 110 boots up, wherein the GUI 172 may provide a list of VCAs that are supported via a configuration file, e.g., VCA device 150, VCA device 152. When the CPE device 110 initially boots up, GUI 172, for example, may be presented on TV 170 to provide the default voice control configurations that are supported. The user can interact with GUI 172 and provide the necessary customizations described herein for the VCAs. GUIs 172, 176, 178, 182, 186, 190 may provide the allowable configurations for each VCA. GUIs 172, 176, 178, 182, 186, 190 present valuable information on the functionality of each VCA, and a user may be able to enable or disable a particular VCA. It is possible that some combinations of configurations may not work with a particular VCA so this screen is used to guide the user towards only configurations that are supported. It is also possible that all VCAs may not be able to run at the same time. For example, if VCA device 150 is an Alexa VCA, VCA device 150 would only support the Alexa Cloud NLU while the CPE VCA 112 may only support a local NLU which runs via the hardware of the CPE device 110. GUIs, such as GUI 172 presented by TV 170 can also be entered after the consumer has previously configured VCA device 150 and then reconfigure VCA device 150. This reconfiguration would require a software download of the reconfigured VCA configuration file to the CPE device 110, and a reboot.

The CPE device 110 may be configured to allow a user to perform runtime configuration of detected voice recognition natural language processing solutions via one or more of GUIs 172, 176, 178, 182, 186, 190. Thus, the CPE device 110 may be configured to allow a user to select a voice recognition natural language processing solution for each enabled VCA, e.g., VCAs 150, 158. A configuration screen of the CPE device 110 may be presented on one or more of GUIs 172, 176, 178, 182, 186, 190 to configure a voice recognition natural language solution supported by the particular VCA. Once again, any combinations that cannot be supported would be clearly noted. Cloud based NLUs may also be available choices for certain voice control solutions.

The CPE device 110 may further be configured to allow a user to perform runtime configuration of IoT device VCA functionality of IoT devices, such as IoT Device 164. Each VCA may provide support for voice commands that can be used with IoT devices that may be purchased. GUIs, such as GUIs 172, 176, 178, 182, 186, 190 would need to provide adequate information on compatibility for a specific IoT device, e.g., IoT Device 164. Reconfiguration of a previously configured IoT Device 164 is possible. As new versions of the configuration files for the CPE Device 110 are fielded, different combinations of VCAs for IoT devices would be made available. One or more GUIs, such as GUIs 172, 176, 178, 182, 186, 190, provide a selection of the IoT devices, such IoT Device 164, that can be controlled and configured with IoT voice control commands. For example, the voice control configuration screen presented by one or more GUIs might list a particular oven that is controllable and also may also list different levels of control and status.

The CPE device 110 is able to download configured VCAs from Download Server 142 at runtime, e.g., during or shortly after bootup. VCAs typically require significant build and runtime configuration, for example, to support a selected microphone source, NLU and wake word. Since it would not be possible to build every combination into a single build, this would mean that the CPE Device 110 would, after configuration of the enabled VCA, download the VCA library from Download Server 142 that would support the particular configuration before starting. The user would have the ability to reconfigure a previously running VCA via the one or more GUIs, and after this reconfiguration is complete, the CPE Device 110 stops the currently executing VCAs. Then, the CPE Device 110 reboots. Thus, CPE Device 110 is able to perform dynamic upgrade of code in the field thereby leveraging currently existing upgrade capabilities to facilitate configuration and/or reconfiguration of VCAs.

One or more GUIs, such as GUIs 172, 176, 178, 182, 186, 190, provide users information regarding the various VCAs that are supported by the CPE Device 110. This information can be accessed via a voice control configuration screen and will direct to a configuration interface screen that provides links for viewing by the user to obtain a better understanding of a particular VCA. In many cases, VCAs can be customized to provide voice control for a specific device. For example, one or more GUIs may provide commands to control via VCA 112 of CPE Device 110, which may be a set-top box or TV launcher application. Control VCA 112 of CPE Device 110 is quite different from Alexa voice control in that it may not interface to the Alexa's cloud environment and will provide specific commands for the CPE Device 110 itself. Thus, links providing information on customized VCAs, such as VCAs 150, 152, via a configuration interface screen enable a user to easily control CPE Device 110.

Since CPE Device 110 provide separate VCAs for both customized VCAs (i.e., device specific such as for VCA 112) and general VCAs (i.e., Alexa such as for VCAs 150, 152), assisting a user by advising them on which VCA is best for which commands and control would be advantageous. For example, to control a TV, such as TV 170, or a set-top box, such as CPE Device 110, on screen guide may be provided by one or more GUIs to indicate which VCA to use (i.e., specialized VCA such as VCA 112). CPE Device 110 is very complex in nature and will most definitely require customized VCA 112. Thus, integration of both specialized and general VCA in CPE Devices 100 are possible.

PCs and mobile phones may include VCAs, wherein a user may access the settings of these devices to enable VCA functionality and adjust the language that used for the voice commands. However, access to these settings do not provide enabling of more than one VCAs as presented herein. These settings also do not provide the ability to configure the wake word, NLU, IoT devices or microphone source as is presented herein. Further, theses settings do provide the ability to enter an informational screen on the specific VCAs that exist and which would be the best to use for a particular group of commands. Accordingly, these devices do not allow these type of advanced configurations and subsequent field upgradability.

GUIs for CPE Device 110 provide infield dynamic configuration and reconfiguration of a VCAs, such as configuration of wake word, microphone source, IoT device control, voice recognition natural language processing solutions, etc. Other configuration items may be supported through the one or more GUIs through additional configuration file upgrades. Thus, it is contemplated that this list for configuration and/or reconfiguration of VCAs presented in GUIs 172, 176, 178, 182, 186, 190 could grow in the future as new capabilities for VCAs are developed. Also, GUIs for CPE Device 110 as described herein includes support of runtime downloadable upgrades of the VCA implementation from Download Server 142 as per the configuration/reconfiguration that is set by a user.

A detailed description of the exemplary internal components of Network Device 130 and the 150, 152, 154, 164, 172, 176, 180, 184, 188, 190 shown in FIG. 1 will be provided in detail in the discussion associated with the subsequent figures. However, in general, the Network Device 130 and the Client Devices 150, 152, 154, 164, 170, 174, 180, 184, 188, 192 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the Network Device 130 and Client Devices 150, 152, 154, 164, 170, 174, 180, 184, 188, 192 may be adapted to execute any operating system, including Linux, UNIX, Windows, MacOS, DOS, and ChromOS as well as virtual machines adapted to virtualize execution of a particular operating system, including customized and proprietary operating systems. The Network Device 130 and the 150, 152, 154, 164, 172, 176, 180, 184, 188, 190 are further equipped with components to facilitate communication with other computing devices over the one or more network connections to local and wide area networks, wireless and wired networks, public and private networks, and any other communication network enabling communication in the system.

Figure 2:
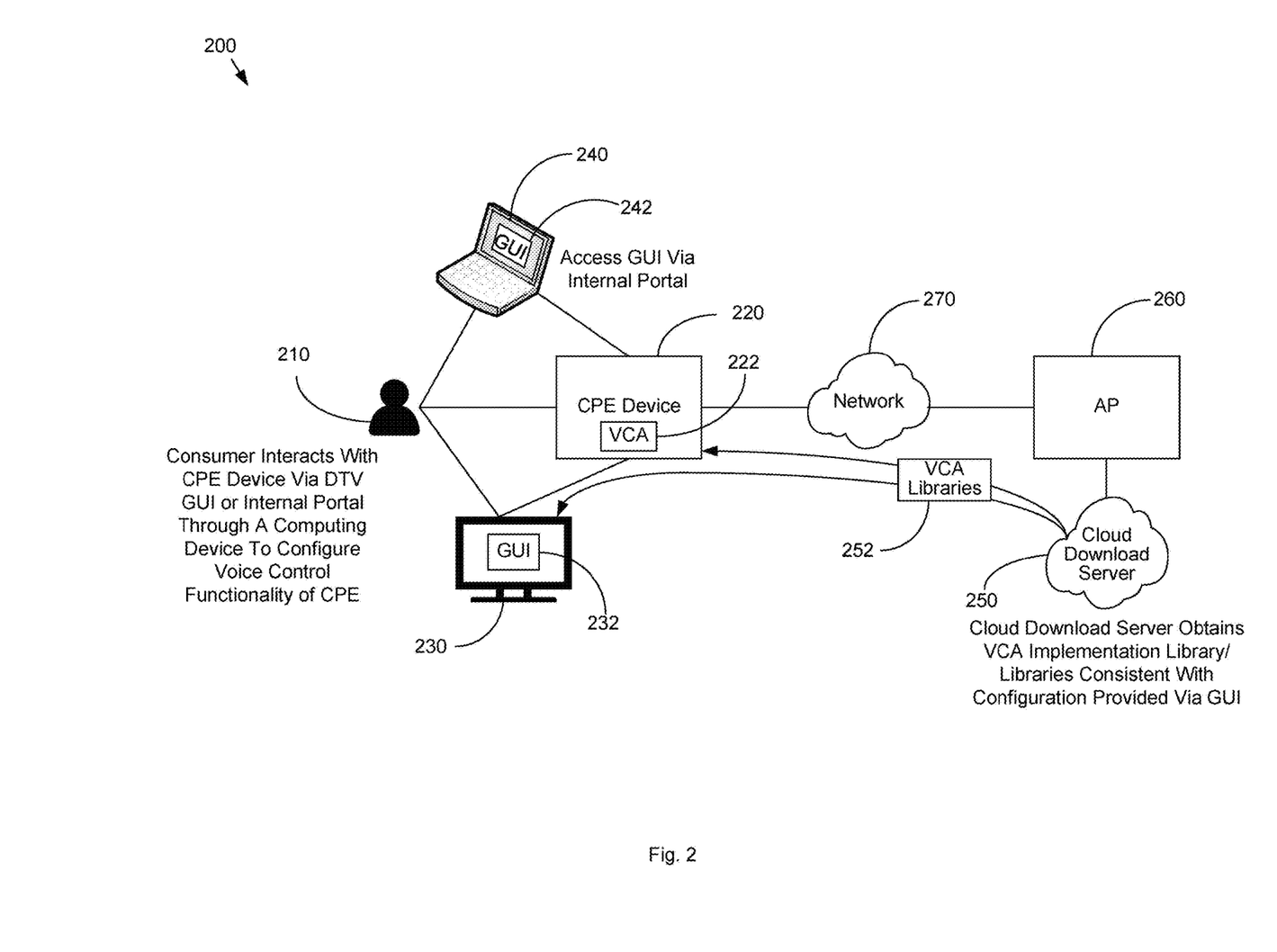
FIG. 2 illustrates a system providing configuration of voice control functionality of a CPE.

FIG. 2 illustrates a system 200 providing configuration of voice control functionality of a CPE.

In FIG. 2, CPE Device 220 is coupled to an Access Point (AP) 260 through Network 270. Cloud Download Server 250 is accessible by CPE Device 220 and Digital TV 230 via AP 260. Computing Device 240 is able to access GUI 242 of CPE Device 220 via an internal portal of CPE Device 220. Digital TV (DTV) 230 may download GUI 232 either from cloud download server 250 or CPE Device 220.

Voice control functionality of CPE Device 220 may be configured through user interaction with CPE Device 220 via GUI 232 of DTV 230 or through GUI 242 obtained by Computing Device 240 via an internal portal of CPE Device 220. A user 210 uses GUI 232 of DTV 230 or GUI 242 of Computing Device 240 to configure voice control elements of VCA 222 of CPE Device 220. After configuration of the enabled VCA 222, Cloud Download Server 250 obtains a VCA Implementation Libraries 252 that are consistent with the configuration data provided via one or more of GUIs 232, 242. VCA libraries 252 that supports the particular configuration are downloaded from the Cloud Download Server 250. Then, the CPE Device 110 reboots.

Figure 3:
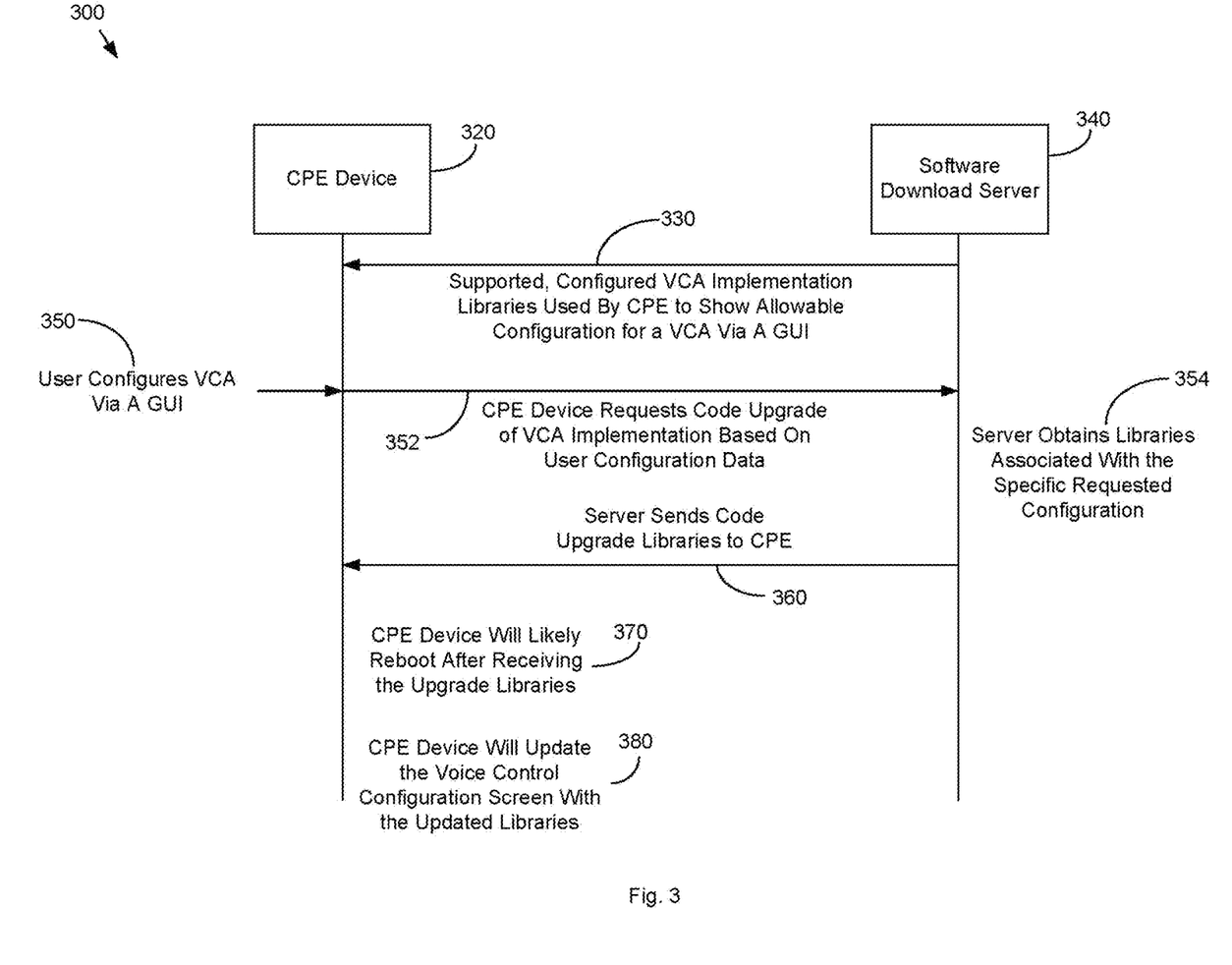
FIG. 3 illustrates an upgrade of a VCA.

FIG. 3 illustrates an upgrade that is provided for a VCA 300.

In FIG. 3, at bootup, CPE Device 320 downloads 330 supported, configured VCA implementation libraries from Software Download Server 340 that are used by CPE Device 320 to show allowable configuration(s) for a VCA via a GUI. A user configures a VCA from the list via the GUI 350. Configuration data is provided to CPE Device 320. A request is sent 352 from CPE Device 320 to Software Download Server 340 for a code upgrade of the VCA of the CPE Device 320 based on the configuration data provided by the user. The Software Download Server 340 obtains one or more libraries associated with the specific requested configuration 354. Next, one or more code upgrade libraries are sent 360 by the Software Download Server 340 to the CPE Device 320. The code upgrade libraries are stored in memory of the CPE Device 320. The CPE Device 320 will reboot after receiving the upgrade libraries 370. The CPE Device 320 will then update the Voice Control Configuration Screen with the updated libraries 380.

Figure 4:
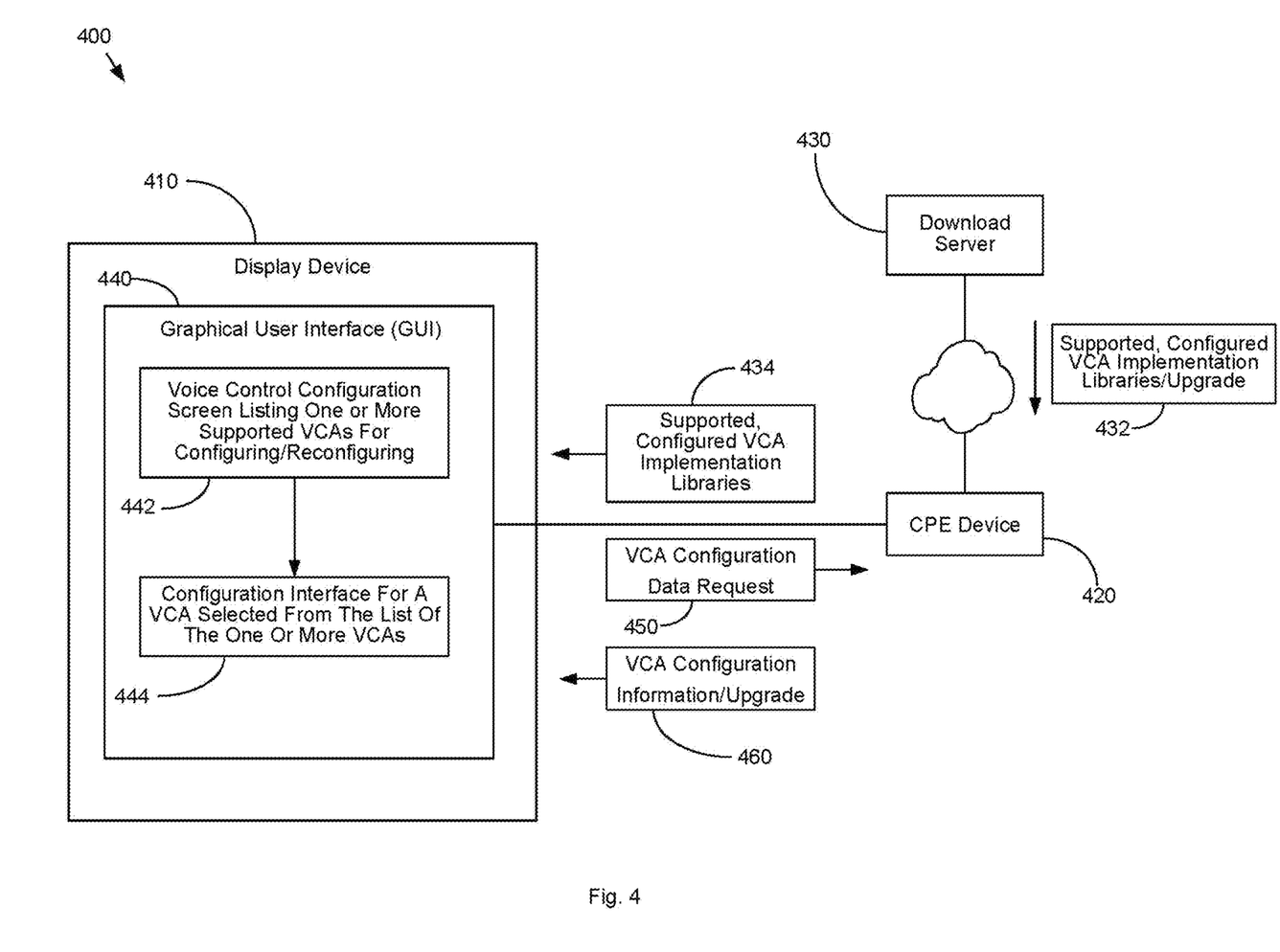
FIG. 4 illustrates configuration of a GUI.

FIG. 4 illustrates configuration of a GUI 400.

In FIG. 4, a Display Device is coupled to a CPE Device 420. CPE Device 420 may access Download Server 430 to obtain Supported, Configured VCA Implementation Libraries 432 at bootup. CPE Device 420 may send Supported, Configured VCA Implementation Libraries 434 so that Graphical User Interface (GUI) 440 shown on Display Device 410 may display in GUI 440 a Voice Control Configuration Screen 442 that lists one or more of the supported VCAs for configurating/reconfiguration. Using GUI 440, the user selects a supported VCA from the Voice Control Configuration Screen 442. After a supported VCA is selected from the Voice Control Configuration Screen 442, the GUI 440 will then direct the user to a Configuration Interface Screen 444 that provides links for viewing by the user to obtain a better understanding of a particular VCA. The user provides configuration input on the Configuration Interface Screen 444 of the GUI 440 for the VCA selected from the list of the one or more VCAs.

GUI 440 sends a VCA Configuration Data Request 450 to a CPE Device 420. The CPE Device 420 determines whether specific implementations per the VCA Configuration Data Request 450 can be provided by an upgrade from Download Server 430. The CPE Device 420 may download the upgrade 432 from Download Server 430, load it, and the CPE device 420 may then reboot. The CPE Device may already have VCA libraries consistent with the VCA Configuration Information 450 stored thereon. CPE Device 440 then sends the VCA Configuration Information 460 to the Display Device 410 for configuring the VCA selected from the Configuration Interface 444.

Figure 5:
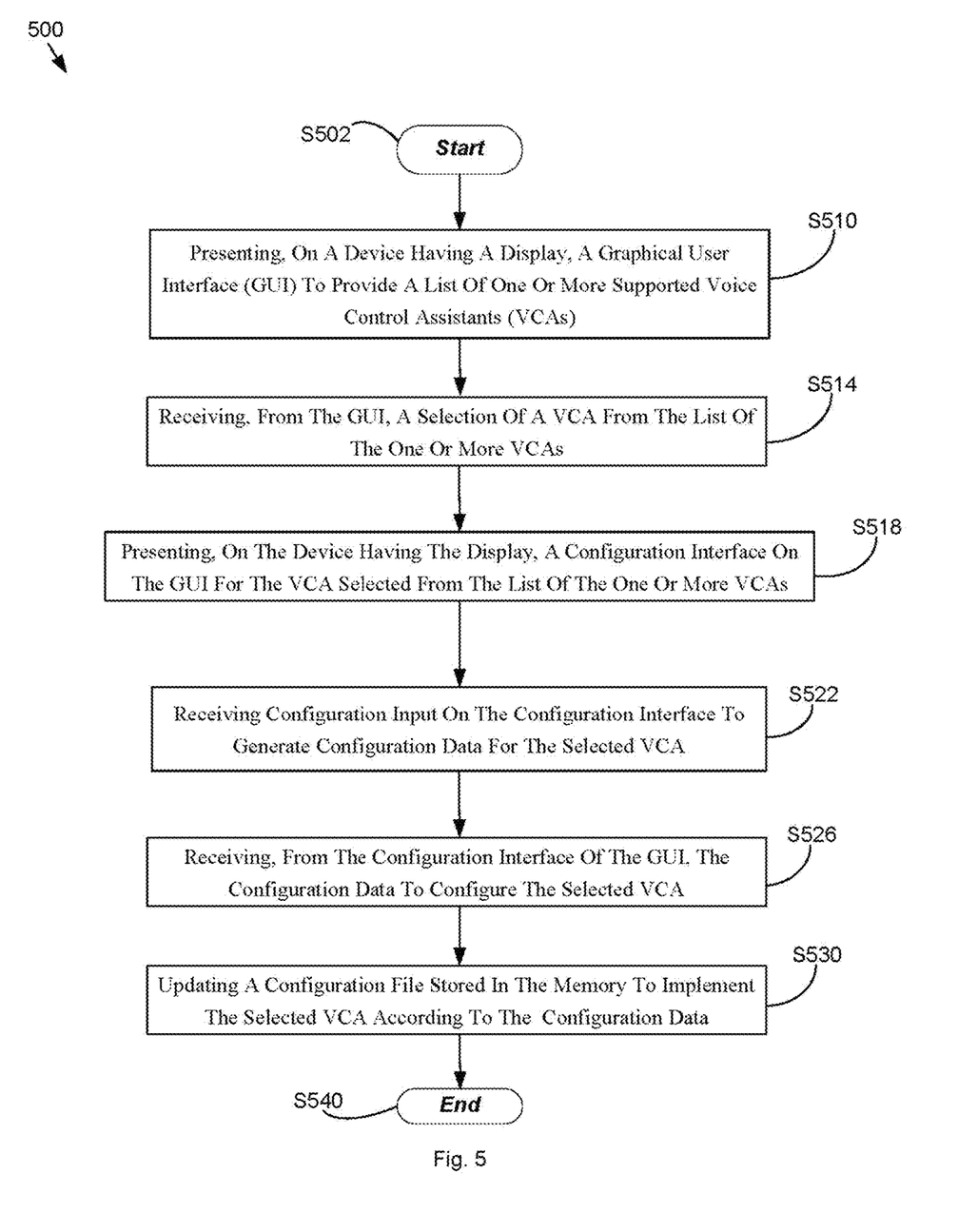
FIG. 5 is a flow chart of a method for providing dynamic configuration and reconfiguration of VCAs for CPE devices.

FIG. 5 is a flow chart of a method 500 for providing dynamic configuration and reconfiguration of VCAs for CPE devices.

In FIG. 5, method 500 starts (S502), and a graphical user interface (GUI) is presented on a display of a device to provide a list of one or more supported voice control assistants (VCAs) (S510). Referring to FIG. 1, GUIs 172, 176, 178, 182, 186, 190 enable a user to configure or reconfigure VCAs. For example, the CPE device 110 may provide GUI 172 that is present by TV 170 after the CPE device 110 boots up, wherein the GUI 172 may provide a list of VCAs that are supported via a configuration file, e.g., VCA device 150, VCA device 152. When the CPE device 110 initially boots up, GUI 172, for example, may be presented on TV 170 to provide the default voice control configurations that are supported.

A selection of a VCA from the list of the one or more VCAs is received from the GUI (S514). Referring to FIG. 4, CPE Device 420 may send Supported, Configured VCA Implementation Libraries 434 so that Graphical User Interface (GUI) 440 shown on Display Device 410 may display in GUI 440 a Voice Control Configuration Screen 442 that lists one or more of the supported VCAs for configurating/ reconfiguration. Using GUI 440, the user selects a supported VCA from the Voice Control Configuration Screen 442.

A configuration interface is presented on the GUI in the display of the device for the VCA selected from the list of the one or more VCAs (S518). Referring again to FIG. 4, after a supported VCA is selected from the Voice Control Configuration Screen 442, the GUI 440 will then direct the user to a Configuration Interface Screen 444 that provides links for viewing by the user to obtain a better understanding of a particular VCA.

Configuration input is received on the configuration interface of the GUI to generate configuration data for the VCA selected from the list of the one or more VCAs (S522). Referring to FIG. 4, the user provides configuration input on the Configuration Interface Screen 444 of the GUI 440 for the VCA selected from the list of the one or more VCAs. Referring to FIG. 2, voice control functionality of CPE Device 220 may be configured through user interaction with CPE Device 220 via GUI 232 of DTV 230 or through GUI 242 obtained by Computing Device 240 via an internal portal of CPE Device 220. A user 210 uses GUI 232 of DTV 230 or GUI 242 of Computing Device 240 to configure voice control elements of VCA 222 of CPE Device 220.

The configuration data to configure the VCA selected from the list of the one or more VCAs is received from the configuration interface of the GUI (S526). Referring to FIG. 3, a request is sent 330 from CPE Device 320 to a Software Download Server 340 for code upgrade of the VCA of the CPE Device 320 based on the configuration data provided by the user. Referring to FIG. 2, after configuration of the enabled VCA 222, Cloud Download Server 250 obtains a VCA Implementation Libraries 252 that are consistent with the configuration data provided via one or more of GUIs 232, 242. VCA libraries 252 that supports the particular configuration are downloaded from the Cloud Download Server 250. Then, the CPE Device 110 reboots.

A configuration file stored in memory of the CPE is updated to implement the VCA selected from the list of the one or more VCAs according to the configuration data (S530). Referring to FIG. 4, GUI 440 sends a VCA Configuration Data Request 450 to a CPE Device 420. The CPE Device 420 determines whether specific implementations per the VCA Configuration Data Request 450 can be provided by an upgrade from Download Server 430. The CPE Device 420 may download the upgrade 432 from Download Server 430, load it, and the CPE device 420 may then reboot. The CPE Device may already have VCA libraries consistent with the VCA Configuration Information 450 stored thereon. CPE Device 440 then sends the VCA Configuration Information 460 to the Display Device 410 for configuring the VCA selected from the Configuration Interface 444. Referring to FIG. 3, a request is sent 352 from CPE Device 320 to Software Download Server 340 for a code upgrade of the VCA of the CPE Device 320 based on the configuration data provided by the user. The Software Download Server 340 obtains one or more libraries associated with the specific requested configuration 354. Next, one or more code upgrade libraries are sent 360 by the Software Download Server 340 to the CPE Device 320. The code upgrade libraries are stored in memory of the CPE Device 320. The CPE Device 320 will reboot after receiving the upgrade libraries 370. The CPE Device 320 will then update the Voice Control Configuration Screen with the updated libraries 380.

The method then ends (S550).

Figure 6:
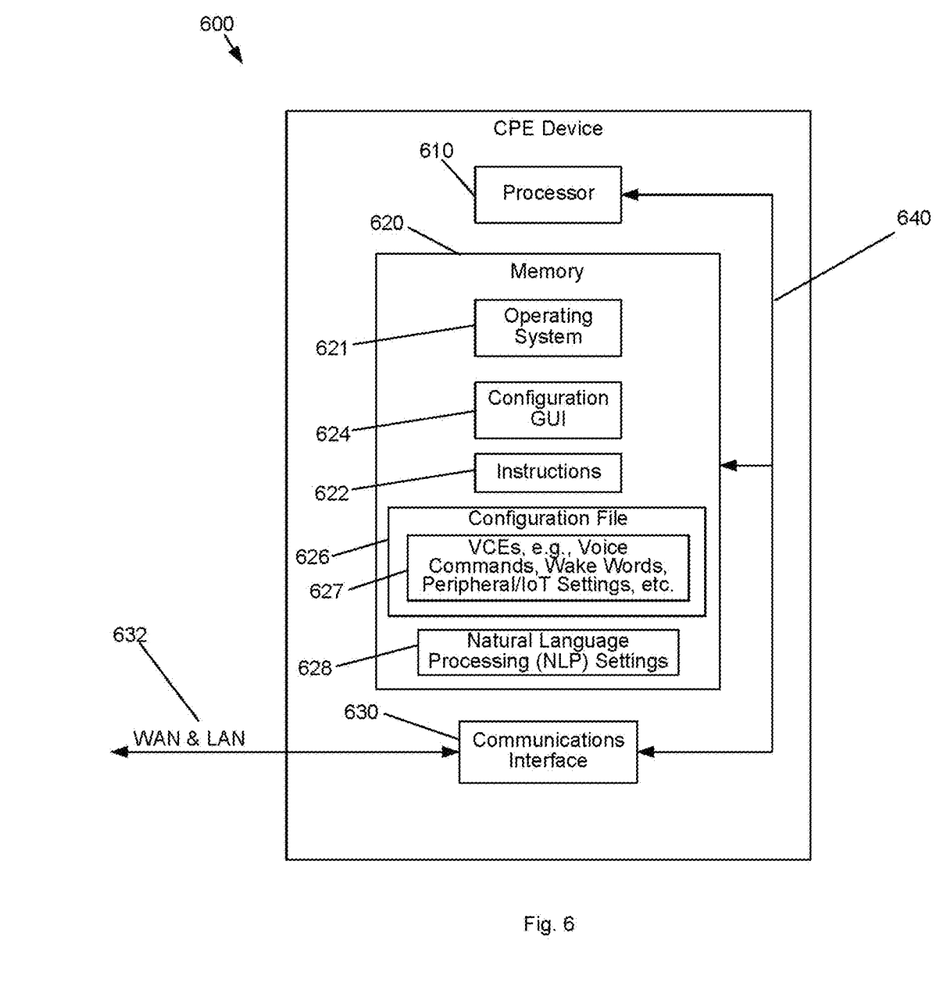
FIG. 6 illustrates a block diagram of a CPE device.

FIG. 6 illustrates a block diagram of a CPE device 600.

In FIG. 6, CPE Device 600 includes Processor 610, Memory 620, and Communications Interface 630, including Radios/Transceivers. Processor 610, Memory 620, and Communications Interface 630 are coupled by a Bus 640. Memory 620 stores information for implementing an Operating System 621. Processor 610 executes Instructions 622 in Memory 620 to implement operation of CPE 600 for providing dynamic configuration and reconfiguration of Voice Control Assistants (VCAs) for CPE Device 600.

Memory also stores Configuration GUI 624 for implementing a GUI for the user to configure/reconfigure VCAs for CPE Device 600. Configuration GUI 624 may be presented on a display device to allow a user to configure/reconfigure VCAs for CPE Device 600. A Configuration File 626 is stored in Memory 620 to implement a VCA selected from the list of the one or more VCAs according to configuration data received via Configuration GUI 624. As new versions of the Configuration File 626 for the CPE Device 600 are fielded, support for different combinations of VCAs are provided. Configuration File 626 may include VCA libraries that are upgraded to be consistent with the VCA configuration information.

Memory also stores one or more Voice Control Elements 627, such as data for implementing Voice Commands, Wake Words, Peripheral/IoT Device Settings, etc.

One or more configurable VCEs includes at least one of a voice command executable by the VCA selected from the list of the one or more VCAs, a voice command to enable a VCA from the list of the one or more VCAs, a voice command to disable enable a VCA from the list of the one or more VCAs, a wake word configuration for initiating control of the VCA selected from the list of the one or more VCAs, a peripheral configuration setting including a configuration for a microphone, and a setting for control of an Internet-of-Things (IoT) device. Memory also includes Natural Language Processing (NLP) Settings 628. The CPE device 110 may be configured to allow a user to perform runtime configuration of detected voice recognition natural language processing solutions via one or more of GUIs using Natural Language Processing (NLP) Settings 628.

Communications Interface 630 receives and transmits data via connection 632. Connection 632 may be a wireless or wired connection, A WAN connection, or a LAN connection, and may be a fronthaul connection or a backhaul connection.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A device having a display, comprising:
   a memory storing computer-readable instructions; and
   a processor configured to execute the computer-readable instructions to:
   access information that defines one or more voice control assistants (VCAs) and supported configurations of the one or more VCAs;
   present a graphical user interface (GUI) to provide a list of the one or more VCAs and the supported configurations of the one or more VCAs based on the accessed information that defines the one or more VCAs and the supported configurations of the one or more VCAs;
   receive a selection of a VCA from the list of the one or more VCAs;
   present a configuration interface showing only the supported configurations of the VCA selected from the list of the one or more VCAs;
   receive configuration input on the configuration interface to generate configuration data for the VCA selected from the list of the one or more VCAs; and
   provide the configuration data to a Customer Premise Equipment (CPE) for implementing the VCA selected from the list of the one or more VCAs according to the configuration data.

2. The device of claim 1, wherein the information that defines the one or more voice control assistants (VCAs) and the supported configurations of the one or more VCAs is obtained from the CPE, wherein the CPE downloads the information that defines the one or more voice control assistants (VCAs) and the supported configurations of the one or more VCAs from a download server.

3. The device of claim 1, wherein the selection of the VCA from the list of the one or more VCAs further includes a selection of one or more configurable VCA elements associated with the VCA selected from the list of the one or more VCAs.

4. The device of claim 3, wherein the one or more configurable VCA elements comprises at least one of a voice command executable by the VCA selected from the list of the one or more VCAs, a voice command to enable a VCA from the list of the one or more VCAs, a voice command to disable a VCA from the list of the one or more VCAs, a wake word configuration for initiating control of the VCA selected from the list of the one or more VCAs, a peripheral configuration setting including a configuration for a microphone, a voice recognition natural language processing (NLP) setting, and a setting for control of an Internet-of-Things (IoT) device.

5. The device of claim 1, wherein the computer-readable instructions executable by the processor to present the GUI and the configuration interface are received from the CPE.

6. The device of claim 1, wherein the one or more VCAs include one or more of a general VCA, a VCA of the CPE, and a VCA of a smart television or set-top box.

7. The device of claim 1, wherein the one or more VCAs include a VCA for combined control of a general VCA and the CPE.

8. The device of claim 1, wherein the device having the display is a television connected to the CPE.

9. A customer premise equipment (CPE) device, comprising:
   a memory storing computer-readable instructions; and
   a processor configured to execute the computer-readable instructions to:
   access information that defines one or more voice control assistants (VCAs) and supported configurations of the one or more VCAs;
   present, on a device having a display, a graphical user interface (GUI) to provide a list of the one or more VCAs and the supported configurations of the one or more VCAs based on the accessed information that defines the one or more VCAs and the supported configurations of the one or more VCAs;
   receive, from the GUI, a selection of a VCA from the list of the one or more VCAs;
   present, on the device having the display, a configuration interface showing only the supported configurations of the VCA selected from the list of the one or more VCAs;
   receive, from the configuration interface of the GUI, configuration data to configure the VCA selected from the list of the one or more VCAs; and
   update a configuration file stored in the memory to implement the VCA selected from the list of the one or more VCAs according to the configuration data.

10. The CPE of claim 9, wherein the information that defines the one or more voice control assistants (VCAs) and the supported configurations of the one or more VCAs is downloaded from a download server.

11. The CPE of claim 9, wherein the processor updates the configuration file stored in memory by:
    determining a link to a download library associated with the VCA selected from the list of the one or more VCAs;
    download, from a download server the download library associated with the VCA selected from the list of the one or more VCAs;
    load the download library for the VCA selected from the list of the one or more VCAs into the configuration file in the memory; and
    perform a reboot to implement the download library for the VCA selected from the list of the one or more VCAs loaded into the configuration file in the memory.

12. The CPE of claim 11, wherein the download library associated with the VCA selected from the list of the one or more VCAs includes one or more associated configurable VCA elements.

13. The CPE of claim 12, wherein the one or more configurable VCA elements comprises at least one of a voice command executable by the VCA selected from the list of the one or more VCAs, a voice command to enable a VCA from the list of the one or more VCAs, a voice command to disable a VCA from the list of the one or more VCAs, a wake word configuration for initiating control of the VCA selected from the list of the one or more VCAs, a peripheral configuration setting including a configuration for a microphone, a voice recognition natural language processing (NLP) setting, and a setting for control of an Internet-of-Things (IoT) device.

14. The CPE of claim 9, wherein device having the display for presenting the GUI and the configuration interface comprises one of a connected television and a computer.

15. The CPE of claim 9, wherein the one or more VCAs include one or more of a general VCA, a VCA of the CPE, and a VCA of a smart television or a set-top box.

16. A method for configuring voice control assistants of a customer premise equipment device (CPE), comprising:
   accessing information that defines one or more voice control assistants (VCAs) and supported configurations of the one or more VCAs;
   presenting, on a device having a display, a graphical user interface (GUI) to provide a list of the one or more VCAs and the supported configurations of the one or more VCAs based on the accessed information that defines the one or more VCAs and the supported configurations of the one or more VCAs;
   receiving, from the GUI, a selection of a VCA from the list of the one or more VCAs;
   presenting, on the device having the display, a configuration interface showing only the supported configurations of the VCA selected from the list of the one or more VCAs;
   receiving, from the configuration interface of the GUI, configuration data to configure the VCA selected from the list of the one or more VCAs; and
   updating a configuration file stored in memory of a Customer Premise Equipment (CPE) to implement the VCA selected from the list of the one or more VCAs according to the configuration data.

17. The method of claim 16, wherein the accessing information that defines one or more voice control assistants (VCAs) and supported configurations of the one or more VCAs further comprises downloading the information that defines one or more voice control assistants (VCAs) and supported configurations of the one or more VCAs from a download server.

18. The method of claim 16, wherein the updating the configuration file stored in the memory to implement the VCA selected from the list of the one or more VCAs according to the configuration data further comprises:
   determining a link to a download library associated with the VCA selected from the list of the one or more VCAs;
   downloading, from a download server, the download library associated with the VCA selected from the list of the one or more VCAs;
   loading the download library for the VCA selected from the list of the one or more VCAs into the configuration file in the memory; and
   performing a reboot to implement the download library for the VCA selected from the list of the one or more VCAs loaded into the configuration file in the memory.

19. The method of claim 18, wherein the downloading the download library further comprises downloading one or more configurable VCA elements associated with the VCA selected from the list of the one or more VCAs.

20. The method of claim 19, wherein the downloading one or more configurable VCA elements associated with the VCA selected from the list of the one or more VCAs further comprises downloading at least one of a voice command executable by the VCA selected from the list of the one or more VCAs, a voice command to enable a VCA from the list of the one or more VCAs, a voice command to disable enable a VCA from the list of the one or more VCAs, a wake word configuration for initiating control of the VCA selected from the list of the one or more VCAs, a peripheral configuration setting including a configuration for a microphone, a voice recognition natural language processing (NLP) setting, and a setting for control of an Internet-of-Things (IoT) device.

21. The method of claim 16, wherein the presenting the GUI and the configuration interface on the device having the display further comprises presenting the GUI and the configuration interface on one of a connected television and a computer.

22. The method of claim 16, wherein the receiving, from the GUI, a selection of a VCA from the list of the one or more VCAs further comprises receiving a selection of one or more of a general VCA, a VCA of the CPE, and a VCA of a smart television or a set-top box.

23. A non-transitory computer-readable media having computer-readable instructions stored thereon, which when executed by a processor causes the processor to perform operations comprising:
   accessing information that defines one or more voice control assistants (VCAs) and supported configurations of the one or more VCAs;
   presenting, on a device having a display, a graphical user interface (GUI) to provide a list of the one or more VCAs and the supported configurations of the one or more VCAs based on the accessed information that defines the one or more VCAs and the supported configurations of the one or more VCAs;
   receiving, from the GUI, a selection of a VCA from the list of the one or more VCAs;
   presenting, on the device having the display, a configuration interface showing only the supported configurations of the VCA selected from the list of the one or more VCAs;
   receiving, from the configuration interface of the GUI, configuration data to configure the VCA selected from the list of the one or more VCAs; and
   updating a configuration file stored in memory of a Customer Premise Equipment (CPE) to implement the VCA selected from the list of the one or more VCAs according to the configuration data.

24. The non-transitory computer-readable media of claim 23, wherein the accessing information that defines one or more voice control assistants (VCAs) and supported configurations of the one or more VCAs further comprises downloading the information that defines one or more voice control assistants (VCAs) and supported configurations of the one or more VCAs from a download server.

25. The non-transitory computer-readable media of claim 23, wherein the updating the configuration file stored in the memory to implement the VCA selected from the list of the one or more VCAs according to the configuration data further comprises:

determining a link to a download library associated with the VCA selected from the list of the one or more VCAs;

downloading, from a download server, the download library associated with the VCA selected from the list of the one or more VCAs;

loading the download library for the VCA selected from the list of the one or more VCAs into the configuration file in the memory; and performing a reboot to implement the download library for the VCA selected from the list of the one or more VCAs loaded into the configuration file in the memory.

26. The non-transitory computer-readable media of claim 25, wherein the downloading the download library further comprises downloading one or more configurable VCA elements associated with the VCA selected from the list of the one or more VCAs.

27. The non-transitory computer-readable media of claim 26, wherein the downloading the one or more configurable VCA elements associated with the VCA selected from the list of the one or more VCAs further comprises downloading at least one of a voice command executable by the VCA selected from the list of the one or more VCAs, a voice command to enable a VCA from the list of the one or more VCAs, a voice command to disable enable a VCA from the list of the one or more VCAs, a wake word configuration for initiating control of the VCA selected from the list of the one or more VCAs, a peripheral configuration setting including a configuration for a microphone, a voice recognition natural language processing (NLP) setting, and a setting for control of an Internet-of-Things (IoT) device.

28. The non-transitory computer-readable media of claim 23, wherein the presenting the GUI and the configuration interface on the device having the display further comprises presenting the GUI and the configuration interface on one of a connected television and a computer.

29. The non-transitory computer-readable media of claim 23, wherein the receiving, from the GUI, a selection of a VCA from the list of the one or more VCAs further comprises receiving a selection of one or more of a general VCA, a VCA of the CPE, and a VCA of a smart television or a set-top box.

* * * * *